United States Patent Office 3,759,852

Patented Sept. 18, 1973

1

3,759,852

PROTECTIVE COATINGS CONTAINING GLASS FLAKE PIGMENT AND ARTICLES COATED THEREWITH

William J. Bradley, 245 Upper Toyon Drive, Kentfield, Calif. 94904

No Drawing. Application Mar. 3, 1967, Ser. No. 620,651, which is a continuation-in-part of application Ser. No. 348,304, Feb. 21, 1964, both now abandoned. Divided and this application Oct. 30, 1969, Ser. No. 872,772

Int. Cl. C08f *45/04;* C08g *51/04;* C09c *3/02*

U.S. Cl. 260—18 EP 27 Claims

ABSTRACT OF THE DISCLOSURE

A pigment for use in organic resin coating compositions which is leafing glass flakes. Protective coating and paint compositions containing the leafing glass flakes and organic resin binder vehicles such as epoxy resin binder vehicles form a glass veneer on a substrate. After the coating composition is applied to a substrate, the glass flakes migrate toward and leaf at the outer surface of the coating forming laminar layers adjacent the surface of the coating. The coatings and paint compositions can be applied as by spraying in a single step to numerous stubstrates to form relatively thin coatings ranging, for example, from 1 to 10 mils in thickness. The coating is bonded to the surface of an article to form an impermeable glass veneer.

The present application is a division of copending application Ser. No. 620,561 filed Mar. 3, 1967, now abandoned which in turn, is a continuation-in-part of copending application Ser. No. 348,304 filed Feb. 21, 1964 and now abandoned. The disclosures of the above two applications are incorporated herein by reference and are relied on.

My invention relates to an improved coating and more particularly, to a protective and decorative coating composition comprising glass flakes in a liquid carrier which may be an organic resin binder vehicle. My invention further pertains to a pigment for use in organic resin coating compositions which pigment comprises leafing glass flakes. Organic resin binder vehicles when mixed with the leafing glass flakes of the present invention form excellent protective and decorative coating compositions which may be used for a wide variety of purposes. When the coating compositions of the present invention are applied to a substrate, the leafing glass flakes migrate toward the outer surface of the coating and automatically laminate in overlapping and parallel relation to each other and the outer surface of the coating forming laminar glass layers adjacent the surface of the coating. The resulting coating can be termed a glass veneer. An important aspect of the invention pertains to articles having at least one surface protectively coated with the aforementioned protective coating compositions and having an impermeable glass veneer bonded to the surface thereof. The present invention further provides essentially impermeable bonded coatings with relatively thin film applications and also permits a single step method of application.

In accordance with the prior known developments of which I am aware, ordinary glass flakes have been combined with organic vehicles such as bisphenol polyester resin to produce corrosion resistant coatings for metal and other materials. The mixture of glass flakes together with the resin binder vehicle and, if necessary or desirable, a catalyst for the resin is conventionally sprayed in comparatively thick films, on the order of 35 to 40 mils onto the material to be protected. After application of the coating according to these prior known methods, it is

2 essential that the surface be rolled with a roller or brushed or troweled in order to mechanically orient the glass flakes to produce a coating with flakes of glass. With this type of prior known coating procedure it has been impractical to achieve satisfactory protective films of less than 25 mils in thickness even when the coating is sprayed and subsequently followed by roller, brush, trowel or mechanical operation to mechanically orient the glass flakes.

It is advantageous to obtain effective corrosion resistant films when applied at lower film thicknesses, for example, in the 1 to 10 mil film thickness range. Employing the methods of the present invention will reduce cost of both material and application. I have further found that it is not only advantageous but practical to avoid the use of the dual processes which are required and necessary in the prior known methods of rolling, brushing or troweling the coating composition, after it is applied to a substrate.

It is therefore an object of my invention to provide a pigment for use in organic resin coating compositions.

It is a further object of my invention to provide improved coating compositions comprising organic resin binder vehicles and a pigment.

It is a further object of my invention to provide a method of protectively coating the surface of an article.

It is a further object of the present invention to provide coated artilcles having a substantially impermeable veneer formed thereon.

In attaining the above objects, one feature of the present invention resides in a pigment for organic resin protective coating compositions comprising leafing glass flakes. When admixed with an organic resin binder vehicle and the admixture is applied to a substrate as a coating, the leafing glass flakes will migrate toward the outer surface of the coating and automatically orient in parallel relation with each other and the outer surface of the coating, in overlapping relation with each other forming laminar glass layers adjacent the surface of the coating.

Another feature of the present invention resides in pigment for incorporation in organic resin coating compositions, the compositions containing an organic resin, solvents and/or diluents, and the usual protective coating or paint ingredients wherein the pigment includes microscopically thin leafing glass flakes which will flow toward and leaf at the outer surface of the coating applied to a substrate and will automatically orient to form laminar layers of glass flakes in overlapping relation with each other and parallel relation with each other and the outer surface of the coating to produce a substantially impermeable glass veneer.

A further feature of the present invention resides in the paint or protective coating compositions which contain an organic resin binder vehicle comprising an organic resin and volatile aliphatic or aromatic solvents and as a pigment therefor, leafing glass flakes which leaf at the outer surface of the coating and form automatic laminations adjacent the outer surface of the coating thus forming a glass veneer.

A further feature of the present invention resides in a method of protectively coating the surface of an article by applying to the surface an admixture of leafing glass flakes and an organic resin binder vehicle, the glass flakes migrating toward and leafing at the outer surface of the coating forming laminar glass layers adjacent the surface of the coating.

A still further feature of the present invention resides in an article having at least one surface and having bonded to said surface a protective coating comprising an organic resin and leafing glass flakes, the flakes being concentrated and orientd in a plurality of laminar layers adjacent the surface of the coating to form a glass veneer on the surface of the article.

The above as well as other objects, features and advantages of the present invention will become apparent from the following detailed description thereof.

My invention permits the application of improved protective coatings to a wide variety of surfaces in an extremely efficient manner which overcomes the drawbacks and disadvantages of prior known coating compositions and methods. Thus, the present invention obviates the need for applying heavy coatings and also avoids the requirement for mechanical operation such as rolling, brushing, troweling or other manipulative steps in order to produce an acceptable coating. My invention includes leafing glass flakes as a pigment for organic resin binder vehicles which glass flakes leaf or migrate toward the outer surface of a coating of the organic resin binder vehicle and the glass flakes forming a glass veneer coating permanently bonded to the substrate.

The leafing glass flakes automatically orient to produce a plurality of laminar layers concentrated at and adjacent the surface of the coating parallel to the surface. The laminar structure acts to inhibit the passage of corrosive substances through the coating to the surface of the material to be protected.

Under the preferred aspects of the invention, the glass flakes are pretreated with a leafing agent prior to mixing with the organic resin binder vehicle. A wide variety of leafing agents can be used although generally they are mono-carboxylic fatty acids containing from about 10 to about 20 carbon atoms. Particularly suitable are stearic acid and palmitic acids and mixtures thereof. It is further preferred to carry out the pretreatment of the glass flakes by depositing on the surfaces of the glass flakes a mixture comprising the leafing agent and a surface active agent or a wetting agent. It is believed that the wetting agent functions to wet the surfaces of the glass creating greater affinity for the leafing agent whereby the leafing agent is retained to a greater degree on the glass flakes. However, applicant does not intend to be bound by any theory. This aspect of the invention can be readily carried out by mixing the leafing agent and the wetting agent together in the presence of an aliphatic or aromatic solvent which is compatible with the leafing agent and wetting agent with or without heating to insure a homogeneous mixture of the ingredients. Thereafter the glass flakes are introduced with gentle mixing to obtain deposition of the mixture on the surfaces of the glass flakes. Of course, various other means can be used to apply the leafing agent mixture to the glass surface, either before or after the flakes are made. Methods of making the glass flakes, per se, are known and described in the literature in detail.

Glass flakes used in accordance with the present invention may be of a random surface area and are relatively flat pieces and are considered to be of microscopic thickness varying, for example, from about ½ to about 10 microns. A commonly available size is generally about 2½ to 3 microns in thickness. The greatest dimension of the glass flake is generally about $\frac{1}{64}$ to ⅛ or ¼ inch, however, this can vary as will be apparent. The glass which is used for making the flakes can vary widely in composition, many of the commercially available glasses are suitable although it is preferred that a corrosion resistant glass be used. Examples of such glasses include borosilicate glasses. Various other glasses are described in Morey: The Properties of Glass, 2nd Ed. Reinhold Publishing Corporation, 1954, particularly Chapter IV, which is incorporated herein by reference. Moreover, the glass flakes may be uniform, variegated, colored, colorless or of random size.

Leafing is a widely known phenomenon of certain materials and may be defined as the propensity of a given material when stirred in the vehicle to migrate into the surface layer of a coating of the vehicle and where the material remains to form a film or layer adjacent the surface of the coating and immediately beneath the surface of the coating.

Glass flakes of the present invention possess the property of leafing, that is, when mixed with organic resin binder vehicle, the flakes will float or migrate to the surface. The flakes do not remain uniformly dispersed throughout the thickness of a coating formed when an admixture of the flakes and the vehicle is applied to a substrate. Some flakes will be dispersed but the important factor is that the flakes in general will tend to leaf toward the surface and concentrate in a plurality of laminar layers adjacent the surface. The glass flakes selected can be all coarse or all fine or any ratio between the coarse or fine flakes depending on the type of surface desired. Flakes of larger diameter size will usually offer greater protection against corrosive atmosphere than glass flakes of lesser diameter. If a greater gloss is desired flakes of lesser diameter are preferred, however, for maximum protection against corrosion, larger size flakes are preferred.

In accordance with one embodiment of my invention I provide a coating composition including a relatively large quantity, for example, 1 to 4 pounds per gallon of binder, of microscopically thin glass flakes mixed with an organic type paint liquid binder. It is to be noted that the amount of flakes will also be influenced by the specific type of organic resin binder selected. Thus, less than one pound per gallon, or more than 4 pounds per gallon may be used as desired or necessary to achieve the intended result. Alkyd resins, epoxy resins, vinyl resins, phenolic resins, urethane resins, polyesters, acrylic resins, polyureas, silicone resins, rubber base type synthetic resins and other synthetic resin paint coating vehicles may be used separately or in combination for combination with the glass flakes. It is to be noted that the selection of the particular organic resin binder; e.g., epoxy, alkyd, vinyl, etc., together with the conventional additives, modifiers and the like, is dependent upon the particular type of coating composition desired and the type of substrate to which it is applied as well as the particular environment to which it will be exposed. Thus, it will be readily apparent to those skilled in paint and protective coating technology that a particular type of resin binder is suitable for a particular application and that no one specific organic resin binder will be best for all purposes. Depending upon whether the substrate is steel, aluminum, zinc, wood, concrete, plaster, or the like, and depending upon the ultimate exposure; i.e., environment, conditions of the coated article, the person having ordinary skill in the art; i.e., the paint technologist, based on experience will be able to select the preferred organic resin binder vehicle including the resin, catalysts, curing agents, solvents, diluents, tinting agents, driers; and other modifiers, additives and secondary ingredients to suit the desired purpose. Volumes have been written covering which organic resin binder vehicle is best for any given purpose. These are matters within the scope of the skilled technician and hence it is unnecessary to elaborate further. The present invention resides in the leafing glass flakes which when added to organic resin binder vehicles of a wide variety result in an excellent protective coating composition. The actual exposure and service conditions, environment, etc., which the coating must withstand are matters which would be taken into consideration by the paint technician in compounding the organic resin binder vehicle for use with the leafing glass flakes.

As noted under the preferred conditions of the invention, the glass flakes are preferably precoated with a leafing agent such as stearic acid and also with a surface active or wetting agent such as the silicone type resin, silicone oil, fatty acid ester, salt thereof, or other wetting agents which are compatible with the leafing agent and which will enhance the affinity of the glass surface for the leafing agent. It is believed that the leafing agent either by itself or in combination with the wetting agent discourages homogeneous mixing with the organic resin binder vehicle and does not have a natural affinity for the vehicle so that the glass flakes having the leafing agent deposited on the surface thereof, will have a tendency to migrate toward the outer surface of the liquid binder vehicle coating forming a plurality of laminar layers parallel to the surface of the vehicle and adjacent thereto. Thus, the pretreated glass flakes leaf or float toward the surface of the vehicle even after being thoroughly mixed with the vehicle. By this method, any desired film thickness may be achieved and the invention is particularly useful for obtaining film thicknesses in the lower range; i.e., approximating 1 to 10 mils. Because the pretreated glass flake of the present invention is a leafing pigment, it is not necessary to have a separate mechanical operation on the applied film in order to cause at least some of the glass flakes to orient in a laminar structure parallel to the plane of the surface being protected.

Depending upon the specific resin binder selected and the specific exposure environment involved, the coating compositions of the present invention may be applied to cleaned and effectively prepared substrates either with or without primers by spraying, brushing and/or other generally employed methods of application of a coating or by means of special types of application equipment which is suitable for application of organic resin paint coatings. The method by which the coating compositions of the present invention are applied is not critical.

The glass flakes, while being primarily oriented in laminar layers and laminated adjacent the surface of the coating are also dispersed to a certain extent throughout the coating so that in addition to reducing the permeability of the coating the glass flakes improve the film's structural strength thus providing substantially improved protection of the substrate. The laminar structure of the coatings prepared in accordance with the present invention acts to inhibit and prevent the passage corrosive solutions, vapors and gases through the coating to the surface of the material to be protected. With the coatings of this type it is practical to achieve excellent protective films in less than 25 mils, particularly less than 10 mils which can be conveniently applied by a single step application although, of course, it will be clear that the invention is not limited to a single step application, a plurality of separately applied coatings may be employed. Moreover, thicknesses of applied coating of 30 mils or more or considerably less than 5 mils may be readily obtained. The present invention is particularly effective in protecting metallic substrates against corrosion by the use of moderate film thicknesses of coating in the range of from about 1 to 10 mils. The preferred optimum range for any given application will vary depending upon the particular exposure and environment conditions. Thus, for coating steel for use in bridges and ships, the thickness of the applied coating will generally range between about 5 and 10 mils. For application in the automotive field, a coating of about 1 mil in thickness can be used. As will be apparent, the actual film thickness of applied coating may vary depending upon the specific resin binder selected, the actual exposure environment specifically involved and the type of substrate surface to be coated.

In accordance with the teachings herein the improved protective coating compositions can be used as a paint for protecting surfaces of materials which are subject to corrosive elements such as salt sprays, chemicals and the like. Some of the various surfaces which can be protected and coated include steel, aluminum, zinc, wood, cement, concrete mortar, plaster and other substrates in general. Suitable for use in exterior or interior applications, the coating composition comprises preferably an organic resin liquid binder including resins such as alkyds, epoxies, vinyls, phenolics, polyesters, polyureas, urethanes, acrylics, silicones, synthetic rubbers and numerous other types of organic resins, either used separately or in any combination. These resinous materials have been widely used for paints and other protective coatings and the exact formulation thereof with solvents, filler, etc., to produce a paint which is suitable for a given application is well within the scope of the paint technologist. It is to be understood that any of these paint and protective coating compositions can be improved in accordance with the manner described herein by incorporating therein the leafing glass flakes of the present invention.

As noted previously, the glass flakes are preferably pretreated with a leafing agent which will cause the flakes when incorporated into the organic resin binder vehicle to float or leaf toward the surface of the binder composition. It is believed that the leafing is due to a variety of factors including specific gravity, surface tension, entrapped air and the like. The leafing agent may have an effect of changing the surface tension between the combination of the flakes and the binder vehicle so as to cause the flakes having a leafing agent deposited thereon to be somewhat repelled by the binder material causing the pretreated glass flakes to tend to move or migrate toward the surface and automatically laminate with each other. Generally, the flakes will lie in overlapping relation to each other and parallel to the exterior surface of the coating. The highly impermeable protective coating which is bonded to the substrate can be termed a "glass veneer" or "glass barrier." It is to be further noted that at least a portion of the pretreated glass flakes will also be dispersed throughout the coating thereby improving the mechanical and structural strength of the coating itself. Various decorative effects can be achieved by changing the specific tinting pigments and other pigments which are used in the binder vehicle. Variation of the conventional organic resin paint vehicles to achieve any given result will be a matter which is within the skill of the paint formulator.

Although it has been noted that the flakes have deposited thereon a leafing agent, it is to be noted that adherence between the leafing agent on the flakes and the binder is not necessary. The flakes may be merely intermingled with the binder without any appreciable bonding between the flakes and the binder. The slip movement of individual glass flakes aids the flexibility of the coating. In addition, a volatile solvent such as an aliphatic or aromatic solvent, preferably a hydrocarbon is present and will evaporate after the coating has been applied and the flakes have had time to orient in laminar layers adjacent the surface of the coating. This volatile solvent may dissolve to a certain extent the leafing agent which is deposited on the flakes so that there may be some direct adherence between the flakes and the binder. In accordance with the preferred aspects of the present invention, prior to mixing with the organic resin binder vehicle, sufficient volatile solvent remains on the pretreated glass flakes to prevent substantial adherence between adjacent precoated glass flakes. The volatile solvent is present to obtain a uniform coating and to prevent the pretreated glass flakes from agglomerating prior to mixing with the organic resin binder vehicle.

It is to be noted that the leafing agent and the surface active agent which is a wetting agent for the glass surfaces may be applied at any time in the formation of the glass flakes. For example, these materials may be sprayed or otherwise applied continuously onto a solid glass member prior to chipping or flaking so that the solid glass members being flaked have the desired treating agents applied thereto. The pretreated glass flakes may then be packaged and stored or shipped, preferably having sufficient volatile solvent present to prevent the glass flakes from setting up and forming an agglomerated mass. The glass flakes can thus be stored in this manner until such time as it is desired to mix the glass flakes with the organic resin paint vehicle, or until such time as is desired for the final application of the coating composition containing the glass flakes and organic resin binder vehicle.

In carrying out the present invention according to a preferred aspect, a quantity of higher organic fatty acids such as stearic or palmitic is dissolved in a quantity of about up to 2% to 3% by weight (based on the weight of solvent) of a compatible volatile aromatic solvent such as xylol, toluol, etc. To this is added a surface active agent or wetting agent that is capable of wetting the surface of the glass and which is compatible with the organic fatty acids used so as to deposit evenly on the surfaces of the glass flakes. Surface active agents that can be used for this purpose include silicone oils, for example, DC–200, or a series of higher molecular weight modified fatty acid ester or salts thereof such as sodium lauryl sulfate, sodium oleyl sulfate and the like. Other surface active agents which may be used are alkali metal salts, particularly sodium salts, of sulfonated fatty acids, e.g., lauryl, oleic. Alkali metal salts of sulfated fatty alcohols, e.g., lauryl, oleyl are suitable. Generally, the amount of surface active agent used is 1% of the weight of the glass flakes to be pretreated, however, the range can vary from about ½% up the 5% or more. The amount of surface active agent used may vary depending upon the amount of higher fatty acid used and the thickness of the film deposits on the glass flake that is desired. It is noted that heavier deposits of organic selected fatty acids on glass flakes will cause agglomeration of the glass flakes and may affect the curing of the resin films or the drying characteristics of the resulting product. When all the aforementioned ingredients are added together, the entire system may be heated up with sufficient heat to liquify the fatty acid and using mild agitation to avoid comminution of the glass flakes. Heat is merely added to assist in the dissolving of the fatty acid, particularly stearic acid in the solvent and to deposit more readily on the glass flakes. When the entire mass is dissolved and the solution is clear the glass flakes are added under slow agitation. Agitation up to about 60 r.p.m. is preferable. The amount of glass flakes is preferably approximately 40% of the weight of the mixture which includes the glass flakes. Amounts greater than 40% may cause less uniform deposition of the mixture on the glass flakes. Amounts of less than 40% may result in wastage of the pretreatment materials. However, these proportions may be varied as desired. Upon addition of the glass flakes, agitation is continued until all the glass flakes have been wetted sufficiently. Generally, one hour is satisfactory for this treatment. When all of the glass flakes have been treated the excess solvent may be separated from the glass flakes and this may be accomplished by the use of a centrifuge or frame filter press and low pressure. The use of low pressure can adjust the amount of solids in the glass flake paste. The solids can be from about 60% and up. After the desired solids content of the pretreated glass flakes is obtained the pretreated glass flake pigment is in the form of a paste which can be stored in a container and used as needed. Generally, it is preferred that the solids content be not more than 85% of the pigment paste.

Although various organic resin materials can be used for purposes of this invention, epoxy resins are particularly useful because of their known excellent properties. In many instances, a single package or uncatalyzed systems can also be used. When using unesterified epoxy resins, it is generally desirable to add the slected type catalyst for the resin and the epoxy resin together shortly before application in order to prevent premature reaction; certain unesterified epoxy resins may be converted by baking. Of course, in instances where the selected resin material will cure under ordinary normal conditions, no catalysts need be employed and the binder composition can be employed as a single composition. Further modification of the binder vehicle by incorporation of fillers such as mica, talc, silica, incorporation of other inorganic or organic pigments, and the incorporation of aromatic or aliphatic solvents can be adjusted to suit the particular application and to suit the conditions which the coated article will be expected to withstand. Such modification, adjustment and alteration of the organic resin binder vehicles are matters that can be readily determined by the paint formulator. The coating compositions of the present invention may be colored or colorless and similarly the ultimate coating bonded on an article may be colored or colorless depending upon the specific formulation employed.

A portion or all of the inorganic material present in the protective coating compositions of the present invention may be the pretreated glass flakes although it will be readily apparent to those skilled in the paint technology that various other conventional inert and inorganic materials which are widely used in organic resin paint vehicles may be present.

In accordance with the preferred embodiment of the present invention, the leafing agent is a higher organic fatty acid which may contain from about 10, preferably 12, to 20 carbon atoms. Particularly useful are stearic or palmitic acids in approximate quantities of up to 2% or 3% of the solvent used. It will be readily apparent that higher proportions of the leafing agent may be used as desired. Any suitable aliphatic or aromatic solvent, particularly hydrocarbon solvents can be used provided they are compatible with the ingredients and do not deleteriously affect the ultimate coating desired. Particularly satisfactory results have been obtained employing aromatic solvents such as xylol, toluol, and the like. The surface active agent which is used is a wetting agent for the glass flakes and is compatible with other ingredients particularly the organic fatty acid and will deposit on the surfaces of the glass flakes to retain the mixture of the wetting agent and the leafing agent on the glass flakes.

The following examples serve to illustrate the present invention.

EXAMPLE I

Gray epoxy structural finish (2 package system)

| | | |
|---|---|---|
| Composition of component No. 1: | | |
| Combined pigments, percent | | 52.5 |
| Titanium dioxide (rutile N.C.), percent | 37 | |
| Fillers (silicates of magnesium and aluminum, Federal Spec. TT-P-403A), percent | 14 | |
| Pretreated glass flakes (stearic acid and sodium lauryl sulfate), percent | 46 | |
| Tinting pigments (lamp black and burnt sienna, Federal Spec. LLL 70 and Federal Spec. TTP 435 Type 2, respectively), percent | 3 | |
| Vehicle, percent | | 47.5 |
| Polyamine solid (catalyst H-3), percent | 58 | |
| Aromatic amines (DMP-30), percent | 5 | |
| Hydrocarbon solvents (xylol, Federal Spec. TT-X-916), percent | 37 | |
| Total | | 100.0 |
| Composition of Component No. 2: | | |
| Combined epoxy resin solids Epon 826 and Epon 815, approximate weight ratio 6:84, respectively, percent | 100 | |
| Epoxy resin-epoxy equivalent | about 175–200 | |

To make the coating composition, one volume of the pigments and vehicle (Composition No. 1) were used with one volume of Component No. 2. The resulting admixture was applied to unprimed steel using common paint spraying apparatus and produced a coating of about 6 mils in thickness in a single application.

The typical molecule of the above Epon resins is as follows:

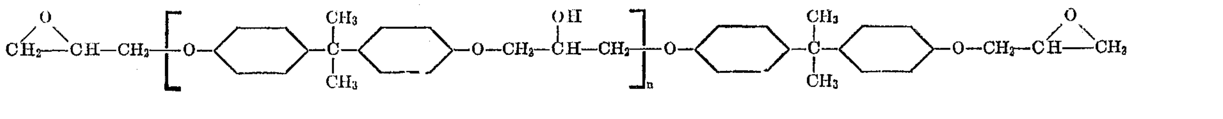

and is the reaction product of a bisphenol and an epihalohydrin.

Epon 826 has a viscosity of 65–95 poises at 25° C. and an epoxide equivalent of 180–188 and Epon 815 has a viscosity of 5–7 poises at 25° C. and an epoxide equivalent of 175–195. DMP 30 is tri-dimethylaminomethyl phenol. Catalyst H–3 is a ketimine curing agent for epoxy resins formed by the reaction of aliphatic diamine with a ketone and has the formula

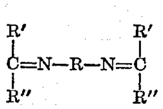

The equivalent weight of H–3 is 101. Other catalysts such as diethylene triamine, diethylamino propylamine, tetraethylene pentamine and the like may also be used in place of the H–3 curing agent.

The glass flakes used in the examples vary from ¼ to 1/64 inch in diameter and average about 2½ microns in thickness.

EXAMPLE II

Modified silicone alkyd resin with pretreated glass flakes (gray)

| | | |
|---|---|---|
| Combined pigments, percent | | 40 |
| Titanium dioxide (all purpose), percent | 75 | |
| Pretreated glass flakes (stearic acid and sodium lauryl sulfate), percent | 15 | |
| Magnesium and aluminum silicates, percent | 8 | |
| Tinting pigments (carbon black), percent | 2 | |
| Total | 100 | |
| Total vehicle, percent | | 60 |
| Silicone alkyd resin solids, percent | 50 | |
| Hydrocarbon solvents (mineral spirits), percent | 49 | |
| Drier-cobalt 2-ethyl hexoate manganese-2-ethyl hexoate, percent | 1 | |
| Total | 100 | 100 |

The alkyd resin identified above is a hydroxy functional polysiloxane (Dow Z–6018) modified pentaerythritol phthalate alkyd resin.

Particularly good silanes for use with polyester and alkyd resins are vinyl triethoxysilane, vinyltrichlorosilane, vinyl-tris(beta-methoxyethoxy)silane, gamma-methacryloxypropyltrimethoxysilane, gamma-glycidoxypropyltrimethoxysilane. Polyester and alkyd resins such as pentaerythritol-phthalate polyester may be modified with the foregoing coupling agents for use in connection with the present invention, particularly in Example II.

EXAMPLE III

Gray epoxy structural finish (all percentages by weight)

| | | |
|---|---|---|
| Pigment, percent | | 33.8 |
| Titanium dioxide-rutile non-chalking type, percent | 56.0 | |
| Pretreated glass flakes (stearic acid-sodium lauryl sulfate), percent | 43.0 | |
| Tinting pigments (as in Example I), percent | 1.0 | |
| Total | 100.0 | |
| Vehicle, percent | | 66.2 |
| Epoxy resin [1] (non-volatile), percent | 18.3 | |
| Resinous curing agent catalyst (nonvolatile) (Versamid), percent | 18.3 | |
| Aromatic hydrocarbon solvent [1] i.e., xylol, percent | 63.4 | |
| Total | 100.0 | 100.0 |

[1] Epoxy resin, Epon 1001 which has the formula shown in Example II and has a viscosity of 1.0–1.7 poises at 25° C. and an epoxide equivalent approximating 425 to 550 (per ASTM Spec. D 1652–59T).

NOTE.—Weight per gallon, 9.75 lb. minimum. (The resinous curing agent catalyst is packaged separately and mixed immediately prior to use.)

EXAMPLE IV

Gray epoxy structural finish

| | | |
|---|---|---|
| Component No. 1, percent | | 74.0 |
| Titanium dioxide-rutile non-chalking type, percent | 18.0 | |
| Pretreated glass flakes (as in Example III), percent | 18.0 | |
| Tinting pigments (same as Example I), percent | 1.0 | |
| Epoxy resin [1] (nonvolatile), percent | 47.5 | |
| Aromatic hydrocarbon solvent i.e., xylol, percent | 15.5 | |
| Total | 100.0 | |
| Component No. 2, percent | | 26.0 |
| Resinous curing agent catalyst (Versamid), percent | 100.0 | |
| Total | | 100.0 |

[1] Epoxy resin, Shell Epon 828 which has the formula shown in Example II and has a viscosity of 100–160 poises at 25° C. and an equivalent weight of 85 and an epoxide equivalent approximating 175 to 200 (per ASTM Spec. D 1562–59T).

NOTE.—Weight per gallon, 9.75 lbs. minimum. In place of the Versamid curing agent, triethylenetetramine or a wide number or other known curing agents for epoxy resins may be used.

It is to be noted that any paint vehicle or organic resin binder vehicle can be used in place of the foregoing specific examples. In general, the leafing glass flakes may be added to the organic resin binder vehicle in amounts of about ½% to 20% or more by weight of the total composition. Greater or lesser amounts of glass flakes can be used depending upon the specific exposure environment conditions. The quantity of glass flakes may be conveniently expressed in pounds per gallon of organic resin binder vehicle and can range from about ¼ to 4 pounds per gallon, although this range can be varied.

What I claim is:

1. A liquid, protective coating composition comprising an admixture of a pigment and an organic resin binder vehicle, said pigment comprising finely divided glass flakes which have been pretreated by having a leafing agent deposited on surfaces thereof in sufficient amount whereby said glass flakes will leaf adjacent the outer surface of a coating formed by applying said coating composition to a substrate, said binder vehicle comprising an organic polymer and sufficient volatile organic solvent whereby said coating composition is of a viscosity to permit the glass flakes to flow and migrate toward the outer surface of said coating, the glass flakes automatically concentrating themselves adjacent the outer surface of said coating.

2. A liquid, protective coating composition as set forth in claim 1 wherein the glass flakes are pretreated with a leafing agent which is a fatty acid containing from 10 to 20 carbon atoms which will be retained on the surfaces of the glass flakes when the pretreated glass flakes are mixed with said binder vehicle.

3. A liquid, protective coating composition as set forth in claim 2 wherein said fatty acid is stearic acid, palmitic acid or mixtures thereof.

4. A liquid, protective coating composition comprising an admixture of pigment and an organic resin binder vehicle, said pigment comprising finely divided glass flakes which have been pretreated with and have deposited on the surfaces thereof a sufficient amount of a leafing agent and a sufficient amount of a wetting agent whereby because of the presence of said leafing agent and said wetting agent acting together said glass flakes leaf adjacent the outer surface of a coating formed by applying said coating composition to a substrate, said wetting agent aiding to retain the leafing agent on the glass flakes, said binder vehicle comprising an organic polymer and sufficient volatile organic solvent to enable said pretreated glass flakes to flow and migrate toward the outer surface of the coating, the glass flakes automatically concentrating adjacent to the outer surface of the coating.

5. A liquid, protective coating composition as defined in claim 4 wherein the leafing agent is monocarboxylic fatty acid containing from 10 to 20 carbon atoms and wherein said wetting agent is present in an amount of from 0.5 to 5% by weight.

6. A liquid, protective coating composition comprising an admixture of a pigment and an organic resin binder vehicle, said pigment comprising finely divided flakes which have been pretreated by having a leafing agent selected from the group consisting of stearic acid, palmitic acid and mixtures thereof and a compatible wetting agent deposited on the surfaces thereof, said wetting agent wetting the surfaces of the glass flakes and being compatible with the leafing agent and aiding in retaining the leafing agent on the glass flake surfaces, said leafing agent and said wetting agent each being present in sufficient amount whereby the glass flakes will automatically leaf adjacent the outer surface of the coating formed by applying the paint composition on a substrate, said binder vehicle comprising an organic resin and sufficient volatile organic solvent to enable the glass flakes to flow and migrate toward the outer surface of the coating, the glass flakes automatically concentrating adjacent to the outer surface of the coating.

7. A liquid, protective coating composition as set forth in claim 6 wherein the organic binder is an epoxy resin and the wetting agent is sodium lauryl sulfate.

8. A protective coating composition as set forth in claim 6 wherein the wetting agent is selected from the group consisting of salts of alkyl sulfates, alkali metal salts of sulfated fatty alcohols and alkali metal salts of sulfonated fatty acids.

9. A protective coating composition as defined in claim 1 wherein said organic binder comprises a member selected from the group consisting of epoxy, alkyd, silicone-modified alkyd, polyurethane-modified alkyd, urethane, phenolic, vinyl, acrylic, polyesters, polyureas, polyurethane resins, and synthetic rubbers.

10. A protective coating composition as defined in claim 1 wherein said glass flakes are made from a corrosion-resistant glass composition.

11. A protective coating composition as defined in claim 1 wherein the organic resin is an epoxy resin which is the reaction product of a bisphenol and an epichlorohydrin and has an epoxy equivalent in the range of about 175 to 200, and the vehicle comprises a polyamine curing catalyst for the epoxy resin and xylol volatile solvent.

12. A protective coating composition as defined in claim 1 comprising about 1 part by volume comprising an epoxy resin which is the reaction product of a bisphenol and an epichlorohydrin which has an epoxy equivalent in the range of about 175 to 200, and about 1 part by volume comprising the pretreated glass flakes, titanium dioxide, fillers, tinting pigments, a polyamine catalyst for the epoxy resin and xylol volatile solvent.

13. A protective coating composition as defined in claim 1 comprising the following ingredients in weight percent:

| | Percent | Total parts |
|---|---|---|
| Combined pigments | | 33.8 |
| Titanium dioxide (rutile) | 56.0 | |
| Pretreated glass flakes | 43.0 | |
| Tinting pigments | 1.0 | |
| Total | 100 | |
| Vehicle | | 66.2 |
| Epoxy resin—epoxide equivalent 425–550 | 18.3 | |
| Catalyst | 18.3 | |
| Xylol solvent | 63.4 | |
| Total | 100 | 100 |

14. A protective coating composition as defined in claim 1 comprising the following ingredients in weight percent:

| | Percent | Total parts |
|---|---|---|
| Component No. 1 | | 74.0 |
| Titanium dioxide (rutile) | 18.0 | |
| Pretreated glass flakes | 18.0 | |
| Tinting pigments | 1.0 | |
| Epoxy resin (epoxide equivalent 175–200) | 47.5 | |
| Xylol solvent | 15.5 | |
| Total | 100 | |
| Component No. 2 | | 26.0 |
| Resinous curing agent catalyst | 100 | |
| Total composition | | 100 |

15. A liquid, protective coating composition consisting essentially of a two-component composition wherein one component comprises an organic resin binder vehicle, and the second component comprises finely divded glass flake pigment which has been pretreated by having a leafing agent which is a fatty acid containing from 10 to 20 carbon atoms and a compatible wetting agent deposited on the surfaces of finely divided glass flakes, said wetting agent being in an amount of 0.5 to 5% by weight, and a catalyst for said organic resin, said leafing agent being present in an amount to cause the glass flakes to leaf when mixed with said binder vehicle, sufficient solvent being present in said coating composition to enable said glass flakes to flow toward and migrate toward the outer surface of a coating formed by applying said paint composition to a substrate.

16. A liquid, protective coating composition comprising an admixture of a pigment and an organic resin binder vehicle, said pigment consisting essentially of finely divided glass flakes which have been pretreated with a leafing agent which is a monocarboxylic fatty acid containing from 10 to 20 carbon atoms and a wetting agent which is compatible with a leafing agent and which aids in retaining the leafing agent on the finely divided glass flakes, said leafing agent and said wetting agent being present in an amount sufficient to enable the glass flakes to automatically leaf in said binder vehicle, said organic resin binder vehicle consisting essentially of an organic resin and a volatile organic solvent in a sufficient amount to permit the pigment to flow and migrate toward the outer surface of the coating formed by applying the coating composition to a substrate.

17. A method of making a liquid protective coating composition comprising forming a paste of finely divided glass flakes, a leafing agent and a volatile organic solvent, said paste being from 60 to 80% by weight solids, the remainder consituting said volatile organic solvent, mixing glass flakes, a leafing agent and a volatile organic solvent, vent, said leafing agent being present in an amount sufficient to enable the automatic leafing of said finely divided glass flakes when mixed with the said organic resin and volatile organic solvent, said solvent being present in sufficient amount whereby said coating composition is of a viscosity to permit the glass flakes pigment to flow and migrate toward the outer surface of a coating formed by applying said coating composition to a substrate.

18. A method as defined in claim 17 wherein a wetting agent is also present in an amount sufficient to aid in retaining the leafing agent on the surfaces of the glass flakes whereby improved leafing of the glass flake pigment is obtained.

19. An article having permanently bonded to a suface thereof a protective, substantially impermeable coating comprising an organic resin and glass flakes, said coating having been formed from a composition prepared by mixing finely divided, glass flakes having a leafing agent deposited on the surfaces thereof with an organic resin binder vehicle, said vehicle comprising an organic resin and a volatile organic solvent, said leafing agent being present in sufficient amount whereby the glass flakes migrate toward the exterior surface of the applied coating, said composition being of a viscosity to enable the glass flakes to flow toward and automatically concentrate in a layer adjacent the outer surface of the coating producing a glass veneer.

20. An article having bonded thereto a coating formed from the composition as defined in claim 4.

21. An article as defined in claim 20 wherein said coating is of a thickness ranging from about 1 to about 6 mils.

22. A liquid, protective coating composition compring an admixture of a pigment and an organic resin binder vehicle, said pigment comprising finely divided glass flakes which have been pretreated by having a leafing agent deposited on surfaces thereof in sufficient amount whereby said glass flakes will leaf adjacent the outer surface of a coating formed by applying said coating composition to a substrate, said binder vehicle comprising an organic polymer and sufficient volatile diluent or organic solvent whereby said coating composition is of a viscosity to permit the glass flakes to flow and migrate toward the outer surface of said coating, the glass flakes automatically concentrating themselves adjacent the outer surface of said coating.

23. A liquid, protective coating composition comprising an admixture of pigment and an organic resin binder vehicle, said pigment comprising finely divided glass flakes which have been pretreated with and have deposited on the surfaces thereof a sufficient amount of a leafing agent and a sufficient amount of a wetting agent whereby because of the presence of said leafing agent and said wetting agent acting together said glass flakes leaf adjacent the outer surface of a coating formed by applying said coating composition to a substrate, said wetting agent aiding to retain the leafing agent on the glass flakes, said binder vehicle comprising an organic polymer and sufficient volatile diluent or organic solvent to enable said pretreated glass flakes to flow and migrate toward the outer surface of the coating, the glass flakes automatically concentrating adjacent to the outer surface of the coating.

24. A method of making a liquid, protective coating composition comprising forming a paste of finely divided glass flakes, a leafing agent and a volatile organic solvent, said paste being from 60 to 80% by weight solids, the remainder consituting said volatile organic solvent, mixing said paste with an organic resin and a volatile diluent or solvent, said leafing agent being present in an amount sufficient to enable the automatic leafing of said finely divided glass flakes when mixed with the said organic resin and volatile diluent or organic solvent, said diluent or solvent being present in sufficient amount whereby said coating composition is of a viscosity to permit the glass flakes pigment to flow and migrate toward the outer surface of a coating formed by applying said coating composition to a substrate.

25. An article having bonded thereto a coating formed from the composition of claim 22.

26. A liquid, protective coating composition comprising an admixture of a pigment and an organic resin binder vehicle, said pigment comprising finely divided glass flakes which have been pretreated by having a leafing agent deposited on the surfaces thereof in sufficient amount whereby said glass flakes will leaf adjacent the outer surface of a coating formed by applying said coating composition to a substrate, said binder vehicle being liquid and comprising an organic polymer coating vehicle of a viscosity to permit the glass flakes to flow and migrate toward the outer surface of said coating, the glass flakes automatically concentrating themselves adjacent the outer surface of said coating.

27. The liquid, protective coating composition of claim 26 wherein in addition to said leafing agent there is deposited on the sufaces of said glass flakes sufficient amount of a wetting agent whereby because of the presence of said leafing agent and said wetting agent acting together said glass flakes leaf adjacent the outer surface of a coating formed by applying said coating composition to a substrate, said wetting agent aiding to retain the leafing agent on the glass flakes.

References Cited

UNITED STATES PATENTS

| | | | |
|---|---|---|---|
| 1,941,398 | 12/1933 | Iliff | 106—308 F |
| 2,036,300 | 4/1936 | Rodman | 106—308 F |
| 2,068,066 | 1/1937 | O'Brien | 106—308 F |
| 2,323,749 | 7/1943 | Dieterle | 106—308 F |
| 3,181,962 | 5/1965 | Rolles | 106—308 F |
| 3,333,980 | 8/1967 | McCord | 106—308 F |
| 2,587,266 | 2/1952 | Wray | 106—308 F |
| 2,970,127 | 1/1961 | Slayter | 260—37 |
| 3,025,179 | 3/1962 | Holbein | 106—308 O |
| 3,036,023 | 5/1962 | Rogers | 260—2.5 |
| 3,053,683 | 9/1962 | Yolles | 260—38 |

FOREIGN PATENTS

| | | |
|---|---|---|
| 832,963 | 4/1960 | Great Britain. |
| 832,964 | 4/1960 | Great Britain. |

OTHER REFERENCES

H. F. Payne, "Organic Coating Technology, vol, II, Wiley & Sons,, 1961, pp. 727–733.

MORRIS LIEBMAN, Primary Examiner

P. R. MICHL, Assistant Examiner

U.S. Cl. X.R.

106—291, 308 F, 308 O; 117—110 S; 260—18 TN, 19 R, 22 R, 23 AR, 37 EP, 37 N, 38, 40 R, 41 AG, DIG 41